B. F. MILLER.
Stove Pipe Drum.
No. 56,774.
Patented July 31, 1866.
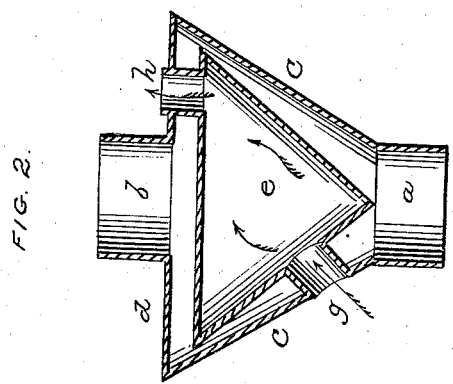
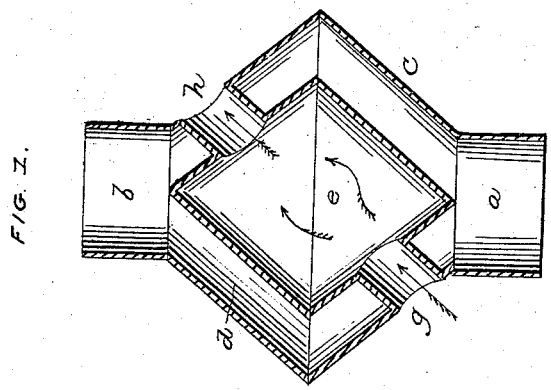
WITNESSES:
Lemuel W. Serrell
Geo. D. Walker
INVENTOR.
B. F. Miller

UNITED STATES PATENT OFFICE.

BENJN. F. MILLER, OF NEW YORK, N. Y.

STOVE-PIPE DRUM.

Specification forming part of Letters Patent No. 56,774, dated July 31, 1866.

*To all whom it may concern:*

Be it known that I, BENJAMIN F. MILLER, of the city and State of New York, have invented, made, and applied to use a certain new and useful Improvement in Caloric-Radiators; and I do hereby declare the following to be a full, clear, and exact description of the said invention, reference being had to the annexed drawings, making part of this specification, wherein—

Figure 1 is a vertical section of my said radiator, and Fig. 2 is a similar view of the same radiator slightly modified in shape.

Similar marks of reference denote the same parts.

The nature of my said invention consists in a radiating and circulating chamber within a drum, the products of combustion circulating through the intervening space, while the air circulates through the inclosed chamber, being admitted through a pipe near its lowest portion and passing off through a pipe from the upper part.

In the drawings, $a$ and $b$ are the pipes through which the gases or products of combustion enter and leave the radiator. $c$ and $d$ are the upper and lower portions of the exterior casing, either conical, as seen in Fig. 1, or one of them flat, as seen in Fig. 2, or otherwise shaped.

The circulating-chamber $e$ is made of a double conical shape, as seen in Fig. 1, or of any other shape adapted to the exterior casing, as in Fig. 2.

$g$ is a pipe passing from the casing $c$ into the chamber $e$, and $h$ is a similar pipe passing through $d$ into $e$.

The air to be heated circulates through the pipes $g$ $h$ and chamber $e$, as indicated by the blue arrows, while the products of combustion circulate around the chamber $e$, causing the caloric to radiate both internally and externally, the heat from the former passing off by the circulating air.

The caloric-radiator shown in Fig. 2 may be used with its flat, or nearly flat, side $d$ either upward or downward.

What I claim, and desire to secure by Letters Patent, is—

The radiating-drum $c$ $d$ and interior chamber, $e$, with the pipes $g$ $h$, constructed substantially as and for the purposes specified.

Dated June 12, A. D. 1866.

B. F. MILLER.

Witnesses:
 LEMUEL W. SERRELL,
 GEO. D. WALKER.